(12) United States Patent
Saxl et al.

(10) Patent No.: US 8,481,881 B2
(45) Date of Patent: Jul. 9, 2013

(54) ELECTRIC CIRCUIT BREAKER AND SWITCHGEAR PANEL WITH CIRCUIT BREAKER

(75) Inventors: David Saxl, Zürich (CH); Markus Amberg, Karlstein (DE)

(73) Assignee: ABB Technology AG, Zürich (CH)

( * ) Notice: Subject to any disclaimer, the term of this patent is extended or adjusted under 35 U.S.C. 154(b) by 54 days.

(21) Appl. No.: 13/300,233

(22) Filed: Nov. 18, 2011

(65) Prior Publication Data

US 2012/0138575 A1    Jun. 7, 2012

Related U.S. Application Data

(63) Continuation of application No. PCT/EP2010/056339, filed on May 10, 2010.

(30) Foreign Application Priority Data

May 20, 2009   (DE) .......................... 10 2009 022 106
Jan. 18, 2010   (DE) .......................... 10 2010 004 982
Apr. 1, 2010    (DE) .......................... 10 2010 013 877

(51) Int. Cl.
*H01H 33/02*   (2006.01)

(52) U.S. Cl.
USPC .............................. 218/156; 218/13; 218/152

(58) Field of Classification Search
USPC ............... 218/13–15, 43, 152, 155, 156, 119, 218/134
See application file for complete search history.

(56) References Cited

U.S. PATENT DOCUMENTS

| 3,641,295 A | 2/1972 | Ferton et al. |
| 4,249,052 A | 2/1981 | Votta et al. |
| 4,442,329 A * | 4/1984 | Gray et al. ....................... 218/71 |
| 6,198,062 B1 * | 3/2001 | Mather et al. .................. 218/152 |

(Continued)

FOREIGN PATENT DOCUMENTS

| DE | 695 051 C | 8/1940 |
| DE | 29 16 567 A1 | 4/1980 |

(Continued)

OTHER PUBLICATIONS

International Search Report (PCT/ISA/210) issued on Aug. 27, 2010, by European Patent Office as the International Searching Authority for International Application No. PCT/EP2010/056339.

(Continued)

*Primary Examiner* — Tulsidas C Patel
*Assistant Examiner* — Marina Fishman
(74) *Attorney, Agent, or Firm* — Buchanan Ingersoll & Rooney PC (57) ABSTRACT

A polyphase (e.g., three-phase) metal-enclosed, gas-insulated high-voltage circuit breaker and a switchgear including the circuit breaker is provided. For each phase, the circuit breaker includes one power arcing chamber pole per phase which are accommodated together in a common circuit breaker housing, and which have at least two connecting outputs per phase. The circuit breaker housing has a number, corresponding to the number of arcing chamber poles of chambers open at their front ends, in which the arcing chamber poles are arranged. The open front ends of the chambers are each respectively closed by means a corresponding dome-like lid covering the corresponding front ends so that a gas link between the individual chambers is provided for via the connection spaces created by the lids.

49 Claims, 5 Drawing Sheets

U.S. PATENT DOCUMENTS

| | | | |
|---|---|---|---|
| 6,410,867 B1 * | 6/2002 | Meyer | 218/120 |
| 6,727,454 B2 * | 4/2004 | Okabe et al. | 218/43 |
| 8,027,152 B1 | 9/2011 | Betz et al. | |

FOREIGN PATENT DOCUMENTS

| | | |
|---|---|---|
| DE | 32 14 823 A1 | 11/1983 |
| DE | 89 07 711 U1 | 8/1989 |
| DE | 43 42 796 A1 | 6/1995 |
| DE | 19807777 C1 | 11/1999 |
| DE | 100 11 888 A1 | 10/2001 |
| DE | 10 2004 061 358 A1 | 7/2006 |
| EP | 1 249 910 A2 | 10/2002 |
| JP | 3-205715 A | 9/1991 |
| JP | 8-033131 A | 2/1996 |

OTHER PUBLICATIONS

German Examination Report for DE 10 201 0 013 877.0 dated Sep. 15, 2010.

ABB Switchgear Handbook, 11th edition, 2006, pp. 446, 504, 507 and 508 (6 pages total).

* cited by examiner

ELECTRIC CIRCUIT BREAKER AND SWITCHGEAR PANEL WITH CIRCUIT BREAKER

RELATED APPLICATION

This application claims priority as a continuation application under 35 U.S.C. §120 to PCT/EP 2010/056339, which was filed as an International Application on May 10, 2010 designating the U.S., and which claims priority to German Application 10 2009 022 106.9 filed May 20, 2009, German Application No. 10 2010 004 982.4 filed Jan. 18, 2010, and German Application No. 10 2010 013 877.0 filed Apr. 1, 2010. The entire contents of these applications are hereby incorporated by reference in their entireties.

FIELD

The present disclosure relates to a polyphase electric metal-enclosed gas-insulated high-voltage circuit breaker, and to a switchgear panel having such a high-voltage circuit breaker.

BACKGROUND INFORMATION

Such high-voltage circuit breakers have a number, corresponding to the number of phases, of circuit breaker poles which are arranged in one plane next to one another or, in the case of three-phase circuit breakers, at the corners of a triangle. In this arrangement, the individual poles can be accommodated in an enclosure, accommodating all poles, which is designated as polyphase enclosure or in each case separately in their own enclosure which is designated as single-phase enclosure. The polyphase-enclosed circuit breaker poles are usually inserted in a tank-shaped housing or in a tank-shaped enclosure which is preferably mounted vertically, the input and output lines and other components and constructional parts being connected to the enclosure transversely thereto.

In the case of such a circuit breaker or in the case of a switchgear system having such a circuit breaker, much space is needed and in addition, a large amount of insulating gas (e.g., $SF_6$) gas is also required.

A switchgear system having a circuit breaker of this type has become known, for example, from the citation Schaltanlagen Handbuch ABB, ABB Switchgear Handbook, 11$^{th}$ edition, 2006, pages 446, 504, 507. The circuit breaker poles are accommodated in a vertically mounted metal enclosure which requires a relatively large amount of space. Because of the dimensions of the enclosure, the quantity of the insulating gas placed in the enclosure is also high.

SUMMARY

An exemplary embodiment of the present disclosure provides a polyphase metal-enclosed, gas-insulated high-voltage circuit breaker. The exemplary circuit breaker includes a circuit breaker housing, a plurality of dome-like lids, and a plurality of power arching chamber poles each respectively provided for a corresponding one of the phases of the circuit breaker. Each power arcing chamber pole is accommodated together in the circuit breaker housing, and each power arcing chamber pole respectively has at least two connection outputs per phase. The circuit breaker housing includes a number of chambers corresponding to the number of arcing chamber poles. The chambers are each open at their respective front ends in which the arcing chamber poles are respectively arranged. The open front ends of the chambers are respectively closed by a corresponding one of the dome-like lids covering the corresponding front ends so that a gas link between individual chambers is provided for via connection spaces created by the lids.

An exemplary embodiment of the present disclosure provides a switchgear panel which includes a circuit breaker as described above. The circuit breaker is arranged horizontally. In at least one busbar arrangement respectively accommodated in each case, one housing is arranged vertically as a busbar connection on top of the circuit breaker. The exemplary switchgear panel also includes a drive mechanism adjoined to one end of the circuit breaker.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a circuit breaker which saves space, on the one hand, and also saves insulating gas on the other hand.

Exemplary embodiments of the present disclosure provide a polyphase (e.g., three-phase) metal-enclosed gas-insulated high-voltage circuit breaker which includes, in each case, one power arcing chamber pole per phase which are accommodated together in a common circuit breaker housing. The exemplary circuit breaker also includes at least two connection outputs per phase, wherein the circuit breaker housing has a number, corresponding to the number of arcing chamber poles, of chambers open at their front ends in which the arcing chamber poles are arranged. The open front ends of the chambers are closed by means of, in each case, one dome-like lid covering the front ends so that the gas link between the individual chambers is provided for via the connection spaces created by the lids.

Due to the fact that the individual circuit breaker poles are accommodated in their own chambers which have a common open gas space only at their ends so that the gas link between the individual chambers is in each case reached at the front ends, the quantity of insulating gas used is distinctly reduced.

An exemplary embodiment of the present disclosure provides that the chambers are formed by tubes in which the circuit breaker poles are arranged. The distance of the outside diameter of the circuit breaker poles from the inside diameter of the tubes is determined by the insulating property of the gas.

In accordance with an exemplary embodiment, the tubes accommodating the arcing chamber poles or circuit breaker poles, and thus also the arcing chamber poles, can be associated triangularly with one another or be located next to one another in one plane which is horizontally aligned.

According to an exemplary embodiment of the present disclosure, the individual tubes forming the chambers can be separated from, in each case, the adjacent ones by means of a common partition.

In this arrangement, the partitions between the chambers can, in each case, form parts of the tubes.

The tubes with the dome-like lids, that is to say the circuit breaker housing, form the metal enclosure for the circuit breaker poles.

An exemplary embodiment of the disclosure provides that the circuit breaker housing has dome stubs which project perpendicularly to the longitudinal extent from the housing or, respectively, are molded of one part with the latter. Openings are provided at the free end walls of the dome stubs into which insulators (e.g., barrier insulators) can be inserted.

In this arrangement, at least two dome stubs can be provided. One of the dome stubs carries the input or output lines leading to the circuit breaker poles, and the other dome stub leads to a busbar arrangement.

In accordance with an exemplary embodiment, three dome stubs can be provided, and a busbar arrangement can be connected to at least one dome stub.

In this case, one busbar arrangement can be connected in each case to two dome stubs located next to one another.

If only one busbar arrangement is provided, the dome stub free of a busbar connecting conductor can be closed or is closed with a dummy plate.

If three dome stubs are provided, the dome stubs may be spaced apart at substantially equal distances from one another.

The connecting conductors which are connected to the circuit breaker poles and are brought out of the enclosure to the outside through in each case one dome stub are, in each case, located in a plane which extends perpendicularly to the longitudinal extent of the circuit breaker poles. The connecting conductors are embedded in insulators which may be constructed as barrier insulators. In this case, the connecting conductors, which can also be called fittings, are cast gas-tight into the insulators. Within the circuit breaker housing, the connecting conductors are connected to electrically conductive sections of the circuit breaker poles. Outside the circuit breaker housing, that is to say outside the insulators, the connecting conductors can be connected to a busbar arrangement or to other components. Such components can be current or voltage transformers or isolating and/or earthing switches. It is also possible to connect a switch input or output, for example, a cable output or an open line.

In accordance with an exemplary embodiment, the contact points of the switch poles can be located between two dome stubs, where one of these dome stubs belongs to the switch input or output belonging to the circuit breaker pole or poles.

Exemplary embodiments of the present disclosure also provide a switchgear panel having a circuit breaker according to the present disclosure. The exemplary circuit breaker is simple in its structure and also in production, and also has little space requirement and needs low quantities of insulating gas.

In accordance with an exemplary embodiment of the present disclosure, the circuit breaker is arranged horizontally, at least one busbar arrangement for connecting in each case one busbar or other components is arranged on the top of the circuit breaker, and the circuit breaker adjoins a drive at one end.

In accordance with an exemplary embodiment, each busbar arrangement can be constructed as a busbar module accommodated in a housing which can be attached at, in each case, one dome stub of the circuit breaker.

This results in an overall space-saving arrangement in which the quantity of the insulating gas is reduced and the current density of the switchgear panel is optimized. Due to the vertical arrangement of the busbar modules on the top of the circuit breaker, advantageous cooling is also obtained within the entire enclosure due to a thermal convection flow.

A switchgear system having a horizontally arranged circuit breaker has become known from the above-cited ABB Switchgear Handbook (see, e.g., p. 508). The enclosure of the present disclosure has a tank in which all circuit breaker poles are accommodated, where, if a dual busbar arrangement is provided, the latter is connected to a single connecting stub at one end of the enclosure and the individual busbars are attached on both sides to a column-like enclosure part connected to the connecting stub. Here, too, the requirement for insulating gas is high in comparison with the switchgear panel according to the present disclosure.

In this context, a drive device for isolating and earthing switches can also be arranged in the control cabinet.

If the switchgear panel adjoins an operator passage, the control cabinet will be exclusively facing the operator passage or bordering it.

An inspection of each circuit breaker pole can then be appropriately carried out from the operator passage through the control cabinet.

In accordance with an exemplary embodiment of the switchgear panel of the present disclosure, each busbar arrangement or each busbar module advantageously includes a busbar housing which is flanged to a dome stub with a housing flange.

If the switchgear panel is intended to be constructed for connecting a dual busbar arrangement, in each case, one busbar housing is flanged to two adjacently located dome stubs for forming the dual busbar arrangement.

In contrast to the abovementioned switchgear system having a horizontally located circuit breaker, both busbars can be connected next to one another on the circuit breaker via the busbar modules when a dual busbar arrangement is provided, which also leads to a reduction in the quantity of insulating gas.

In the case of the switchgear panel according to the present disclosure, isolating and/or earthing switches can be operated by means of mechanical transmission means.

In accordance with an exemplary embodiment, since the drives for the isolating switches and earthing switches are accommodated in the control cabinet, these drives are easily accessible from the operator passage.

If the switchgear panel according to the present disclosure is to be equipped with at least one pressure relief unit, the latter are to be arranged in such a manner that they let off compressed gas, produced during an operating event in the case of a fault, into an area outside the operator passage.

Figure 1:
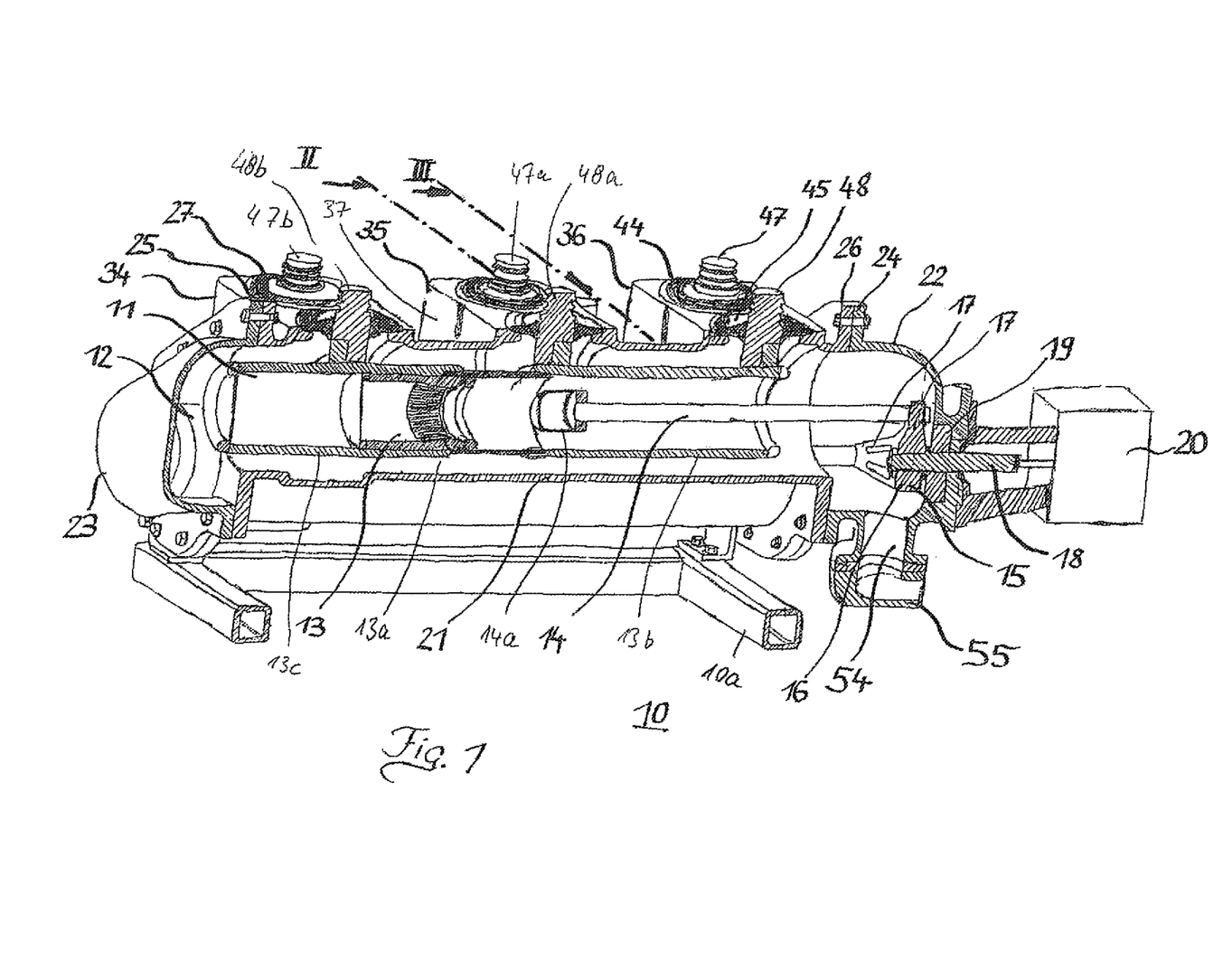
FIG. 1 shows a longitudinal sectional view through a circuit breaker according to an exemplary embodiment of the present disclosure.
Figure 2:
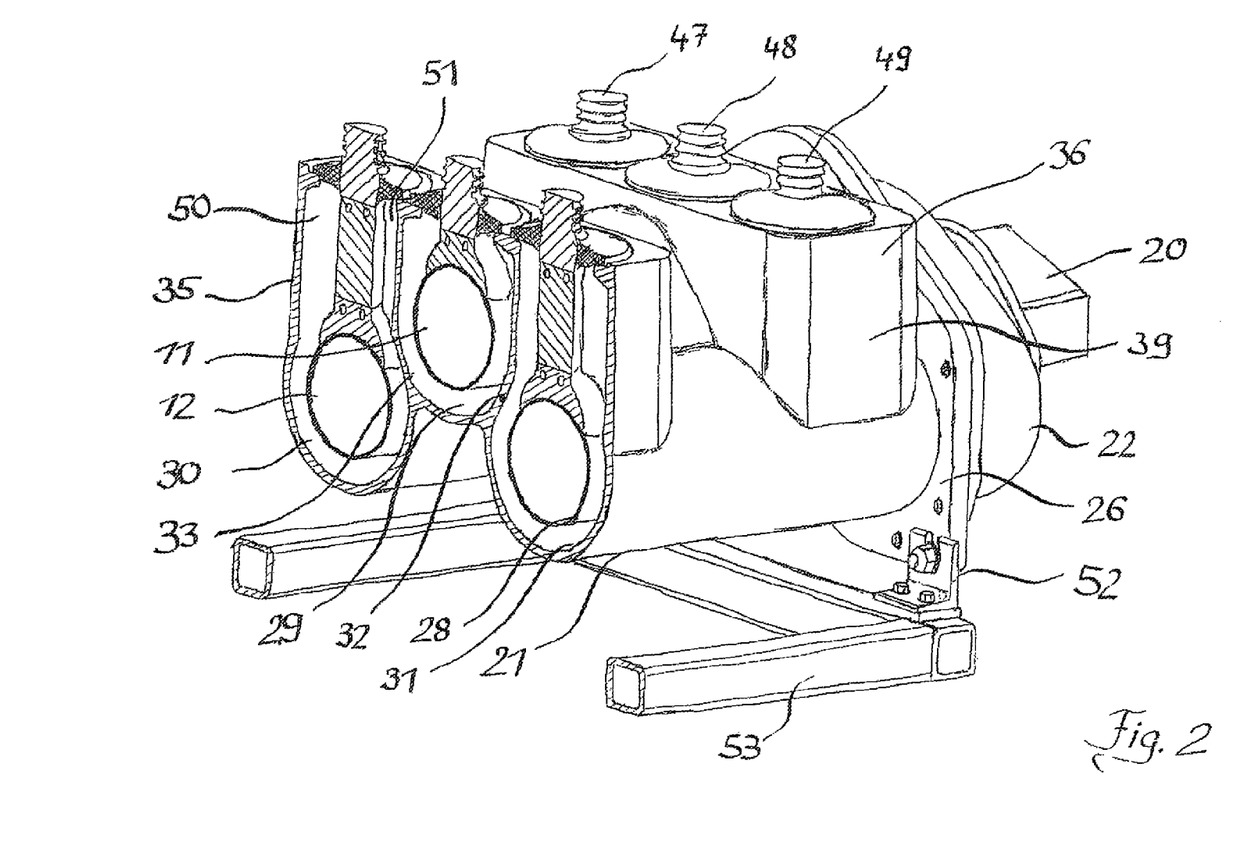
FIG. 2 shows a sectional view according to the section line II-II of FIG. 1.
Figure 3:
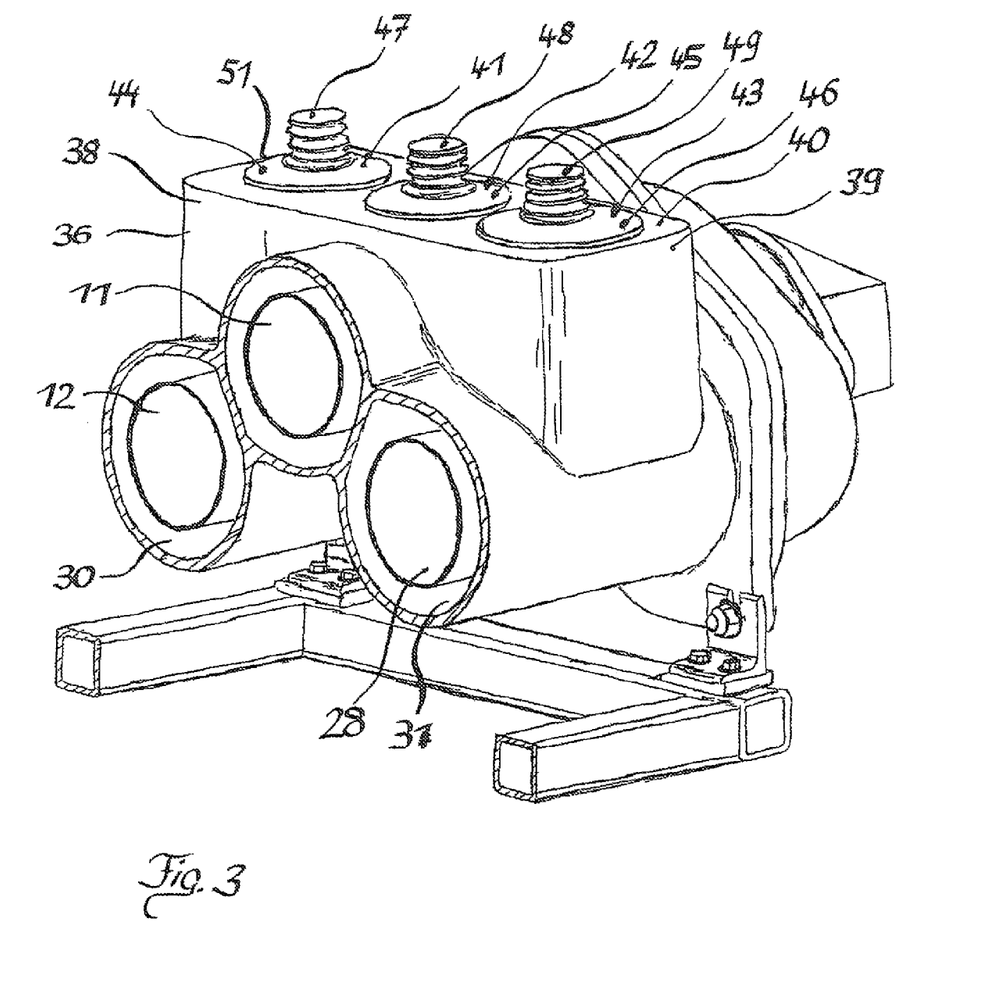
FIG. 3 shows a sectional view according to the section line III-III of FIG. 1.

Reference will now be made to FIGS. 1 to 3.

A circuit breaker 10, in this example, a three-phase circuit breaker, has a number of circuit breaker poles 11 and 12. The number of circuit breaker poles 11 and 12 corresponds to the number of phases. The circuit breaker poles 11 and 12 are also called arcing chamber poles. The circuit breaker pole 11 is shown diagrammatically in a longitudinal sectional view in FIG. 1. The arcing chamber 13 is shown diagrammatically with installed parts. In this arrangement, there is in each arcing chamber 13 a fixed contact member 13a and a moving contact member 14a. The moving contact member 14a is connected to a switching rod 14 which protrudes out of the end of the respective arcing chamber pole 11. The switching rod 14 is connected to a yoke 15 to which the switching rods of the other circuit breaker poles are connected. The third circuit breaker pole is located in front of the sectional plane and is therefore not visible in the exemplary illustration of FIG. 1. In this arrangement, the yoke 15 has a central part 16 on which arms 17 are integrally molded. The switching rods 14 for each arcing chamber pole are connected to the ends of the arms 17. The central part 16 of the yoke 15 is connected to a transmission rod 18 which is coupled via a thrust bushing 19 to a drive mechanism 20. The drive mechanism 20 can be constructed, for example, as hydraulic stored-energy spring mechanism and is not of significance for understanding the exemplary embodiments of the present disclosure and therefore will not be described in greater detail here. In a similar manner, the thrust bushing 19 is also not of significance for understanding the exemplary embodiments of the present disclosure will also not be described in greater detail. In addition, the constructional configuration of the arcing chambers 13 is also not of significance for understanding the exemplary embodiments of the present disclosure. It is to be noted, however, that a contact point is formed by the fixed and the moving contact member 13a and 14a in each circuit breaker pole.

The circuit breaker poles 11 and 12 are accommodated in a circuit breaker housing 21, which may also be abbreviated as housing 21 or enclosure 21 herein. The breaker housing 21 has an elongated shape and is closed at the free ends on the left and on the right by means of a dome-like lid 22 and 23 in each case. The thrust bushing 19 is located in the lid 22. The dome-like lids 22, 23 have flanges 24, 25 which are attached to corresponding flanges 26 and 27 on the housing 21.

Reference shall now be made to FIG. 2.

FIG. 2 shows a cross sectional view of the circuit breaker 10 according to the section line II-II of FIG. 1. Within the housing 21, the arcing chamber poles 11 and 12 and the arcing chamber pole 28 (not visible in FIG. 1) are located. These three arcing chamber poles 11, 12 and 28 are arranged at the corners of an equilateral triangle, the plane of which spanned by the arcing chamber poles 12, 28 is located vertically at the bottom and extends horizontally.

The housing or the enclosure 21 is adapted to the arcing chamber poles 11, 12 and 28. It therefore has a number, corresponding to the number of arcing chamber poles 11, 12 and 28, of chambers 29, 30 and 31 which are also associated with one another on the corners of the equilateral triangle on which the arcing chamber poles 11, 12 and 28 are arranged. The chamber 29 for the arcing chamber pole 11 encloses the arcing chamber pole 11 in such a manner that the distance between the outer surface of the arcing chamber pole 11 and the inner surface of the chamber 29 is dimensioned in such a manner that flashovers between the arcing chamber pole 11 to the housing 21 are prevented, which naturally also applies to the chambers of the other arcing chamber poles. The chamber 29 is in each case separated from the chambers 31 and 30 by a partition 32, 33 so that the partitions 32 and 33 both form in each case a part of the chamber 29 and a part of the chambers 30 and 31, respectively, and correspondingly separate all chambers from one another. As a result, the individual chambers 29, 30, 31 are constructed approximately tubularly and in the area of the arcing chamber poles 11, 12, 28 themselves, there is no gas link between the chambers 29, 30 and 31 because of the partitions 32, 33.

The individual chambers 29, 30 and 31 are open towards their free ends and are jointly closed off in each case with the lids 22, 23 covering the chambers 29, 30, 31. The inner spaces of the lids 22, 23 thus form the gas link of the chambers 29, 30, 31 at the two ends of the housing 21.

Due to the fact that the individual chambers 29, 30 and 31 are geometrically constructed like tubular individual enclosures and act in such a manner which is particularly visible from FIG. 3, the space requirement is reduced, on the one hand, and, on the other hand, the quantity of the insulating gas located inside the housing 21 is clearly reduced as compared with a so-called tank solution.

In other words, the circuit breaker housing, or also the enclosure, between the front ends is formed by individual tubes, the centre axes of which, like the centre axes of the circuit breaker poles, are arranged at the corners of an equilateral triangle as can be clearly seen from FIG. 3. As a result, the tubes are placed triangularly with one another, two tubes in each case, where the chamber 29 and 31 and, respectively, 29 and 30, are connected to one another in each case via the two common partitions 32, 33.

FIG. 1 shows an enclosure, on which three dome stubs 34, 35 and 36 are integrally molded perpendicularly to the plane spanned by the two arcing chambers 12 and 28. Among the illustrated stubs 34, 35 and 36, the dome stub 35 is shown in greater detail in the exemplary illustration of FIG. 3.

FIG. 3 shall now be considered.

Dome stub 36, which is similar to dome stubs 34 and 35, has a rectangular cross section, the sectional plane of which extends horizontally. Two side walls 37 each, namely the longer ones, extend transversely to the longitudinal extent of the arcing chamber poles 11, 12 and 28, and the side walls 39, which are shorter, extend approximately in parallel with the longitudinal extent of the arcing chamber poles 11, 12 and 28. The shorter side walls 39 open approximately tangentially into the outer surfaces of the chambers 31 and 30 and, together with the longer side walls 38, are aligned tapering so that the cross sectional area, which extends in parallel with the plane extending through the arcing chambers 28 and 12, slightly tapers towards the free end of the side walls 38 and 39. The side walls 38 and 39 are connected at their free ends to an end wall 40 which closes off the dome 36, and thus also the domes 34 and 35, towards the top in the example of FIG. 3. Openings 41, 42 and 43 are located in the end wall 40. Disc or barrier insulators 44, 45 and 46 are inserted in the openings 41, 42 and 43 in a gas-tight manner through which cast-in fittings 47, 48 and 49 pass to which connecting lines can be connected which then lead to a busbar arrangement or another line (e.g., a cable output or an open line). If barrier insulators are used, the fittings 44, 45, 46 are inserted in a gas-tight manner into the barrier insulators, and the barrier insulators are also inserted in a gas-tight manner into the openings 41, 42, 43.

The fittings 47, 48; 47a, 48a; 47b, 48b belonging to one another are in each case located in a plane which extends substantially perpendicularly to the longitudinal extent of the arcing chamber poles.

The fittings 47, 48; 47a, 48a are connected at an electrically conductive section 13b of the arcing chambers 13 on the side of the contact point 13a facing the drive mechanism 20, and the fittings 47b, 48b are connected at the section 13c on the side of the contact point 13a located opposite to the drive mechanism 20.

The exemplary embodiment of the dome stub 34 is the same as that of the dome stub 36.

The dome stubs 34, 35 and 36 can also be closed in each case by means of a closing lid as a dummy cover. In FIG. 2, the side walls 50 and 51 corresponding to side walls 39 can be seen from the inside.

The dome stubs 34, 35, 36 are in each case arranged at substantially the same distance from one another, where the distance between each two corresponds to one module dimension.

In accordance with an exemplary embodiment, the circuit breaker housing 21 is arranged to be lying together with the circuit breaker poles or arcing chamber poles 11, 12 and 28 arranged therein and attached to a support rack 53 by means of its flanges 26 and 27 via carriers 52.

In accordance with an exemplary embodiment, both of the lids 22 and 23 are constructed to be pot-shaped, for example. At the lids 22 and 23, one stub 54 is arranged in each case to have a safety unit 55 (e.g., a bursting disc) be flanged thereto, if desired. The safety unit 55 protects the enclosure 21 of the circuit breaker 10 against damage in the case of a fault. It is also possible to provide a bushing for a gas line to which, for example, a density monitor or the like can be connected.

Figure 4:
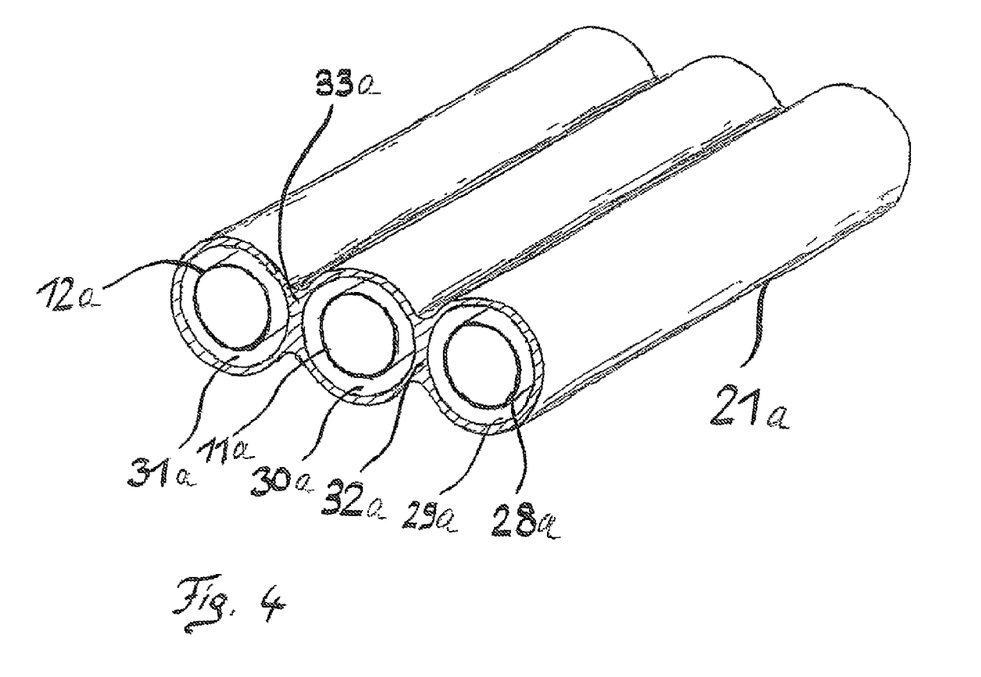
FIG. 4 shows an exemplary embodiment of a circuit breaker according to the present disclosure, in which the switch poles are arranged in one plane.

Exemplary embodiments of the present disclosure have been described for circuit breaker poles which are arranged at the corners of a triangle. However, a corresponding solution can also be provided when the individual circuit breaker poles are located in a horizontally extending plane. These can then be surrounded by a tube in each case in the same manner as in the arrangement according to the exemplary embodiments of FIGS. 1 to 3. This arrangement is shown in FIG. 4. The circuit breaker poles 28a, 11a and 12a are located inside the tubes 29a, 30a, 31a, respectively, and partitions 32a and 33a are located in each case between the tubes 31a, 32a, 29a. The partitions in each case form part-areas of the tubes 31a, 32a and 29a similar to the partitions 32 and 33 of the arrangement according to FIG. 2. Here, too, dome stubs and lids are provided as in the arrangement of FIGS. 1 to 3.

Figure 5:
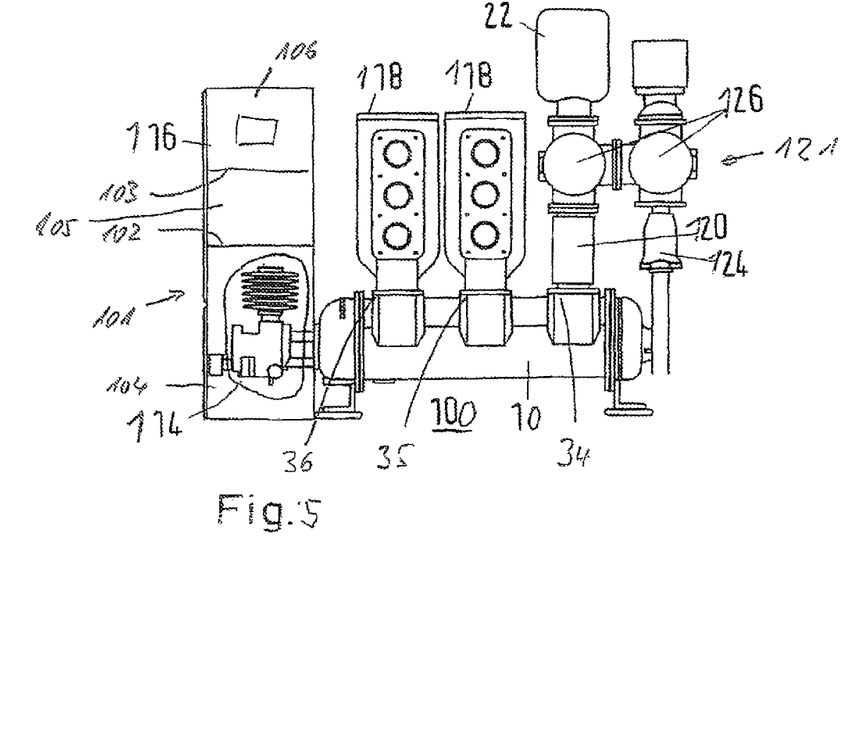
FIG. 5 shows a diagrammatic representation of a switchgear panel having a circuit breaker according to FIGS. 1 to 3 and a dual busbar panel.

FIG. 5 shows a switchgear panel 100 according to an exemplary embodiment of the present the disclosure having a circuit breaker 10 of FIGS. 1 to 3. In front of the switchgear panel 100 (e.g., on the left in the drawing of FIG. 5), a control cabinet 101 is located which is subdivided into three part-spaces 104, 105 and 106 by means of two horizontal air-permeable partitions 102 and 103. In the lower part space 104, a drive mechanism 114 corresponding to the drive mechanism 20 is located which can be constructed, for example, as a stored-energy spring mechanism. A part space 105 accommodating a control module is arranged above the part space 104. The part space 105 contains components for a protective function and panel cabling. Above the part space 105, the part space 106 is located in which drive components for the isolating/earthing switches are located. These components can be constructed as electric drive mechanisms or manual drive mechanisms, for example. If required, mechanical locking of the individual components is also possible.

Overall, the individual components can be combined in a module-like manner. For example, a terminal strip of a current transformer unit can be accommodated in its module housing with its own sealing. In the part space 105, the display device of an $SF_6$ sensor or of a density monitor could also be accommodated. The sensor can thus be easily monitored by an operator from the operator passage.

The control cabinets of several switchgear panels mounted next to one another are gaplessly lined up next to one another and, as a result, produce optimum protection for operating persons present in an operator passage in front of the control cabinets in the case of a fault and the occurrence of hot $SF_6$ gas, for example, when a bursting disc bursts.

Additional housings or plugs, etc. with their own protective class, their own splashed water protection, their own heating or their own monitoring devices are no longer necessary. Similarly, IP 545 plugs can be omitted.

On the circuit breaker 10, busbar arrangements 118 which are in each case accommodated in a housing as busbar modules are mounted on the adjacently located dome stubs 36 and 35. On the dome stub 34, a current transformer 120 is located to which an input or output line 121 is connected which leads to a cable output 124 in this case.

Since the busbar arrangements 118 and the input or output lines 121 are arranged above the circuit breaker 10, the floor area of the switchgear panel 100 is essentially determined by the space requirement of the circuit breaker 10. An additional, although lower space requirement, is determined by the drive mechanism 114 and the control module 116 located above the drive mechanism 114.

In accordance with an exemplary embodiment, the drive mechanism provided for the circuit breaker may be a mechanical drive which can be, for example, a hydraulic stored-energy spring mechanism. Any other suitable drive mechanism is also naturally conceivable.

Isolating and/or earthing switches can be arranged in the busbar arrangement 118 or above the voltage transformer 120. Isolating switches can also be accommodated in housings 126.

Figure 6:
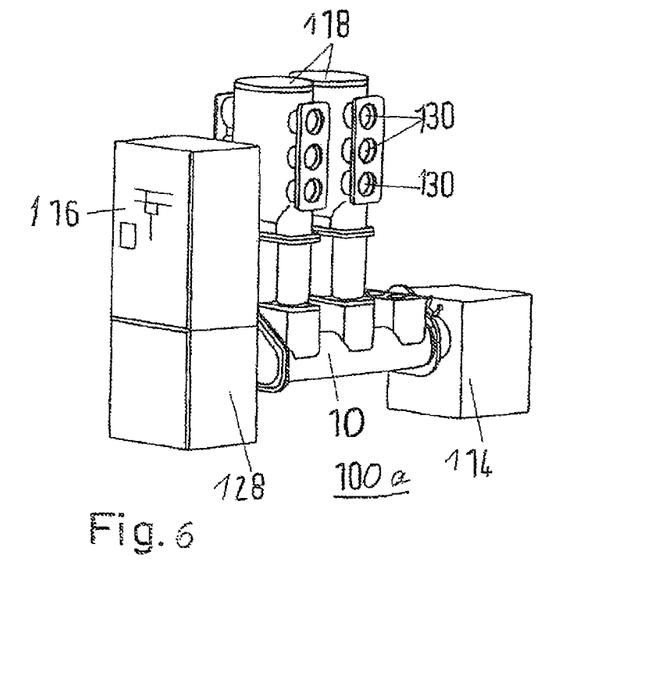
FIG. 6 shows a diagrammatic representation of a coupler panel according to an exemplary embodiment of the present disclosure.

FIG. 6 shows a so-called coupler panel 100a in which two adjacently arranged busbar arrangements 118, between which the contact points of the circuit breaker are located, are arranged next to one another above the circuit breaker 10. By means of the coupler panel 110a, two busbar tracks are coupled to one another so that both busbar tracks can be operated independently of one another. The corresponding circuit arrangement is known such that it does not need to be discussed in greater detail here. When the switchgear panel is used as coupler panel, the circuit breaker 10 is rotated by 180° with respect to the arrangement according to FIG. 5 so that the control module 116 is located at the end of the circuit breaker 10 located opposite to the drive mechanism 114. The exemplary switchgear panel according to the present disclosure can thus be used in several ways without any essential changes being required in the switchgear panel.

Of the busbar arrangements 118, only the housings are drawn here at which flanges, protruding in opposite directions, with openings 130 are mounted to which busbar tracks can be connected.

The disclosure has been described with reference to a three-phase installation. Naturally, it is possible to construct the installation also as a two-phase installation with the same arrangement of the busbar arrangements, of the drive mechanism and the other components and modules.

Given the design of the circuit breaker according to the present disclosure, on the one hand, and of the switchgear panel, on the other hand, the individual components can be produced in the manner of modules. For this purpose, the width of the housings for the busbar arrangements is given by a module dimension which is also reflected in the distances between the dome stubs so that all components apart from the circuit breaker 10 correspond to the module dimension in at least one dimension, for example, in the direction which extends in the longitudinal direction of the arcing chamber poles. This simplifies the assembly and creates a great possibility of varying the arrangement of the components.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| List of reference designations | |
|---|---|
| 10 | Circuit breaker |
| 11 | Circuit breaker pole, arcing chamber pole |
| 12 | Circuit breaker pole arcing chamber pole |
| 13 | Arcing chamber |
| 13a | Fixed contact member |
| 14 | Switching rod |
| 14a | Moving contact member |
| 15 | Yoke |
| 16 | Central part |
| 17 | Arm |
| 18 | Transmission rod |
| 19 | Thrust bushing |
| 20 | Drive mechanism |
| 21 | Circuit breaker housing, housing, enclosure |
| 22 | Lid |
| 23 | Lid |
| 24 | Flange |
| 25 | Flange |
| 26 | Flange |
| 27 | Flange |
| 28 | Arcing chamber pole |
| 29 | Chamber, tube |
| 29a | Chamber, tube |
| 30 | Chamber |
| 30a | Chamber, tube |
| 31 | Chamber |
| 31a | Chamber, tube |
| 32 | Partition |
| 32a | Partition |
| 33 | Partition |
| 33a | Partition |
| 34 | Dome stub |
| 35 | Dome stub |
| 36 | Dome stub |
| 38 | Side wall |
| 39 | Side wall |
| 40 | End wall |
| 41 | Opening |
| 42 | Opening |
| 43 | Opening |
| 44 | Disc insulator |
| 45 | Disc insulator |
| 46 | Disc insulator |
| 47 | Fitting |
| 47a, 47b | Fitting |
| 48 | Fitting |
| 48a, 48b | Fitting |
| 49 | Fitting |
| 49a, 49b | Fitting |
| 50 | Side wall |
| 51 | Side wall |
| 52 | Carrier |
| 53 | Rack |
| 54 | Stub |
| 55 | Safety unit |
| 100, 100a | Switchgear panel |
| 113 | Drive mechanism |
| 116 | Control module |
| 118 | Busbar arrangement |
| 120 | Current transformer |
| 121 | Input, output line |
| 124 | Cable output |

What is claimed is:

1. A polyphase metal-enclosed, gas-insulated high-voltage circuit breaker comprising:
   a circuit breaker housing;
   a plurality of dome-like lids; and
   a plurality of power arcing chamber poles each respectively provided for a corresponding one of the phases of the circuit breaker, each power arcing chamber pole being accommodated together in the circuit breaker housing, and each power arcing chamber pole respectively having at least two connection outputs per phase, wherein:
   the circuit breaker housing includes a number of chambers corresponding to the number of arcing chamber poles, the chambers each being open at their respective front ends in which the arcing chamber poles are respectively arranged; and
   the open front ends of the chambers are respectively closed by a corresponding one of the dome-like lids covering the corresponding front ends so that a gas link between individual chambers is provided for via connection spaces created by the lids.

2. The circuit breaker according to claim 1, wherein the chambers are formed by tubes in which the arcing chamber poles are arranged, and
   wherein a distance of an outside diameter of the arcing chamber poles from an inside diameter of the tubes is based on an insulating property of the gas.

3. The circuit breaker according to claim 2, wherein the tubes accommodating the arcing chamber poles and the arcing chamber poles are associated triangularly with one another.

4. The circuit breaker according to claim 2, wherein the tubes accommodating the arcing chamber poles and the arcing chamber poles are located in one plane which is horizontally aligned.

5. The circuit breaker according to claim 2, wherein the tubes individually forming the chambers are separated from adjacent other ones of the tubes by means of a corresponding one of a plurality of partitions such that adjacent tubes are respectively separated by a common partition.

6. The circuit breaker according to claim 5, wherein the partitions between the chambers in each case form parts of the corresponding tubes.

7. The circuit breaker according to claim 1, wherein the circuit breaker housing comprises dome stubs which project perpendicularly to a longitudinal extent from the housing or are respectively molded of one part with the housing,
   wherein openings are provided at free end walls of the dome stubs into which openings insulators are insertable, respectively.

8. The circuit breaker according to claim 7, comprising at least two dome stubs,
   wherein one of the dome stubs is configured to carry at least one of input and output lines leading to the arcing chamber poles, and another one of the dome stubs leads to a busbar arrangement.

9. The circuit breaker according to claim 8, comprising: three dome stubs,
   wherein at least one of the dome stubs is configured to have a busbar arrangement connectable thereto.

10. The circuit breaker according to claim 9, wherein one busbar arrangement is respectively connectable to two adjacently located dome stubs.

11. The circuit breaker according to claim 8, wherein when only one busbar arrangement is provided, the dome stub free of busbar connecting conductors is configured to be closed by means of a dummy plate.

12. The circuit breaker according to claim 8, wherein the dome stubs are spaced apart at substantially equal distances from one another.

13. The circuit breaker according to claim 1, wherein the lid located oppositely to an arcing chamber of the arcing chamber poles comprises a thrust bushing for a drive mechanism of the arcing chamber poles, respectively.

14. The circuit breaker according to claim 8, wherein contact points of the arcing chamber poles are located between two of the dome stubs, and
wherein one of the dome stubs belongs to a switch output belonging to one of the arcing chamber poles.

15. A switchgear panel, comprising:
a circuit breaker according to claim 1, the circuit breaker being arranged horizontally;
in at least one busbar arrangement respectively accommodated in each case, one housing arranged vertically as a busbar connection on top of the circuit breaker; and
a drive mechanism adjoined to one end of the circuit breaker.

16. The switchgear panel according to claim 15, comprising:
a control cabinet into which the drive mechanism for the circuit breaker is configured to be arranged.

17. The switchgear panel according to claim 16, comprising:
a drive device for isolating and earthing switches arranged in the control cabinet.

18. The switchgear panel according to claim 17, comprising:
an operator passage,
wherein the control cabinet exclusively faces the operator passage.

19. The switchgear panel according to claim 16, wherein the control cabinet is subdivided by means of horizontal partitions into a number of part spaces in which components for the switchgear panel are located.

20. The switchgear panel according to claim 19, wherein the horizontal partitions are porous.

21. The switchgear panel according to claim 17, wherein the control cabinet is subdivided by means of horizontal partitions into a number of part spaces in which components for the switchgear panel are located, and
wherein electric or manual drive mechanisms for the isolating/earthing switches are located in an upper part space of the control cabinet.

22. The switchgear panel according to claim 21, wherein the drive mechanism for the circuit breaker poles is located in a lower part space of the control cabinet.

23. The switchgear panel according to claim 8, wherein the operator passage is configured to enable an inspection of each circuit breaker pole.

24. The switchgear panel according to claim 15, wherein a busbar arrangement is connected to at least one dome stub.

25. The switchgear panel according to claim 24, wherein the busbar arrangement comprises a busbar housing which is flanged to a dome stub with a housing flange.

26. The switchgear panel according to claim 25 for connecting a dual busbar arrangement,
wherein one busbar housing is in each case flanged to two adjacently located dome stubs for forming the dual busbar arrangement.

27. The switchgear panel according to claim 26, wherein contact points of the circuit breaker poles are located outside an area of the dome stubs for connecting housing of the busbar.

28. The switchgear panel according to claim 15, comprising:
mechanical transmission means for operating at least one of isolating and earthing switches.

29. The switchgear panel according to claim 18, comprising:
at least one pressure relief unit,
wherein the at least one pressure relief unit is configured let off compressed gas produced during an operating event in the case of a fault into an area outside the operator passage.

30. The circuit breaker according to claim 1, wherein the circuit breaker is a three-phase circuit breaker.

31. The circuit breaker according to claim 3, wherein the tubes individually forming the chambers are separated from adjacent other ones of the tubes by means of a corresponding one of a plurality of partitions such that adjacent tubes are respectively separated by a common partition.

32. The circuit breaker according to claim 31, wherein the partitions between the chambers in each case form parts of the corresponding tubes.

33. The circuit breaker according to claim 31, wherein the circuit breaker housing comprises dome stubs which project perpendicularly to a longitudinal extent from the housing or are respectively molded of one part with the housing,
wherein openings are provided at free end walls of the dome stubs into which openings insulators are insertable, respectively.

34. The circuit breaker according to claim 33, comprising at least two dome stubs,
wherein one of the dome stubs is configured to carry at least one of input and output lines leading to the arcing chamber poles, and another one of the dome stubs leads to a busbar arrangement.

35. The circuit breaker according to claim 34, comprising:
three dome stubs,
wherein at least one of the dome stubs is configured to have a busbar arrangement connectable thereto.

36. The circuit breaker according to claim 35, wherein one busbar arrangement is respectively connectable to two adjacently located dome stubs.

37. The circuit breaker according to claim 34, wherein the dome stubs are spaced apart at substantially equal distances from one another.

38. The circuit breaker according to claim 34, wherein the lid located oppositely to an arcing chamber of the arcing chamber poles comprises a thrust bushing for a drive mechanism of the arcing chamber poles, respectively.

39. The circuit breaker according to claim 34, wherein contact points of the arcing chamber poles are located between two of the dome stubs, and wherein one of the dome stubs belongs to a switch output belonging to one of the arcing chamber poles.

40. The circuit breaker according to claim 4, wherein the tubes individually forming the chambers are separated from adjacent other ones of the tubes by means of a corresponding one of a plurality of partitions such that adjacent tubes are respectively separated by a common partition.

41. The circuit breaker according to claim 40, wherein the partitions between the chambers in each case form parts of the corresponding tubes.

42. The circuit breaker according to claim 40, wherein the circuit breaker housing comprises dome stubs which project perpendicularly to a longitudinal extent from the housing or are respectively molded of one part with the housing,
wherein openings are provided at free end walls of the dome stubs into which openings insulators are insertable, respectively.

43. The circuit breaker according to claim 42, comprising at least two dome stubs, wherein one of the dome stubs is configured to carry at least one of input and output lines leading to the arcing chamber poles, and another one of the dome stubs leads to a busbar arrangement.

44. The circuit breaker according to claim 43, comprising: three dome stubs,
wherein at least one of the dome stubs is configured to have a busbar arrangement connectable thereto.

45. The circuit breaker according to claim 44, wherein one busbar arrangement is respectively connectable to two adjacently located dome stubs.

46. The circuit breaker according to claim 43, wherein the dome stubs are spaced apart at substantially equal distances from one another.

47. The circuit breaker according to claim 43, wherein the lid located oppositely to an arcing chamber of the arcing chamber poles comprises a thrust bushing for a drive mechanism of the arcing chamber poles, respectively.

48. The circuit breaker according to claim 43, wherein contact points of the arcing chamber poles are located between two of the dome stubs, and wherein one of the dome stubs belongs to a switch output belonging to one of the arcing chamber poles.

49. The switchgear panel according to claim 19, wherein the horizontal partitions are perforated.

* * * * *